United States Patent [19]

Ferraro

[11] Patent Number: 4,630,392
[45] Date of Patent: Dec. 23, 1986

[54] BAIT STATION

[76] Inventor: Michael J. Ferraro, 3833 Catalpa Dr., Dayton, Ohio 45405

[21] Appl. No.: 744,232

[22] Filed: Jun. 13, 1985

[51] Int. Cl.⁴ .................. A01M 1/20; A01M 25/00
[52] U.S. Cl. ..................................................... 43/131
[58] Field of Search ................................ 43/131, 124

[56] References Cited

U.S. PATENT DOCUMENTS

| 1,274,123 | 7/1918 | Wigginton | 43/131 |
| 2,837,861 | 6/1958 | Graham | 43/131 |
| 3,040,470 | 6/1962 | Kanin | 43/131 |
| 4,364,194 | 12/1982 | Clark | 43/131 |
| 4,375,732 | 3/1983 | Waast | 43/131 |
| 4,400,904 | 8/1983 | Baker | 43/131 |

FOREIGN PATENT DOCUMENTS

WO82/03968  11/1982  PCT Int'l Appl. ............ 43/131

Primary Examiner—Gene P. Crosby
Attorney, Agent, or Firm—Jerome P. Bloom

[57] ABSTRACT

A bait station for rodents, an elongate, hollow tubular structure having a single opening to and from its interior. This station is formed of tubing fabricated, preferably, of tough, corrosion, weather and distortion resistant plastic such as a polyvinylchloride. Its preferred configuration provides that one end portion of its tubular structure is enlarged as to its cross sectional area to define a bait chamber the entrance to and exit from which is limited to a single passage, defined by its remaining length the remote end of which provides the single opening to and exit from the passage. The cross sectional area of said passage is made substantially less than that of said chamber. This precludes entrance by animals larger than that of the target rodents. Preferred bait embodies a non-poisonous anti-coagulant, ingestion of which produces a breakdown of the rodent's life support system and its expiration, but not until some time after the rodent leaves the vicinity of the bait station. Most preferred embodiments of the invention have one or more very small apertures in the wall of their bait chamber and the end remote therefrom arranged for press fit in a tubular adapter which forms an extension thereof. This adapter may be inserted in a hole formed in the wall of a dumpster, other waste container or building, adjacent its base, and suitably secured thereto to dispose the interconnected bait station within the structure to which it applies with only its access opening revealed at the exterior of the wall.

15 Claims, 3 Drawing Figures

U.S. Patent  Dec. 23, 1986  4,630,392
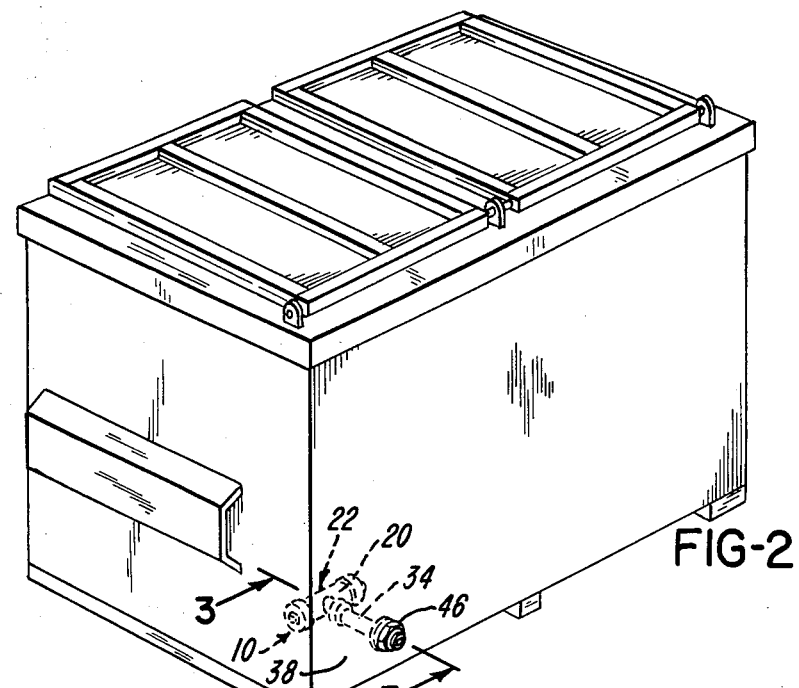
FIG-2
FIG-1
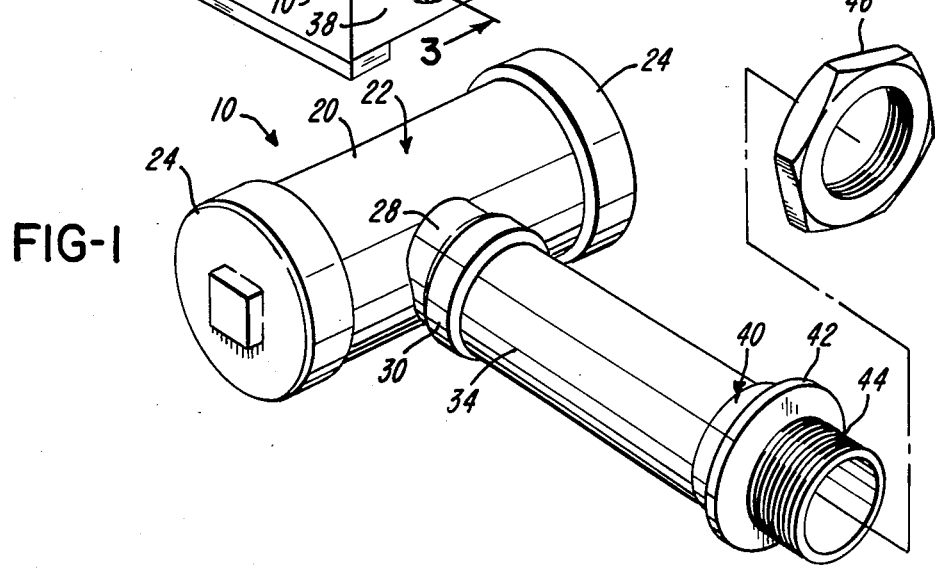
FIG-3
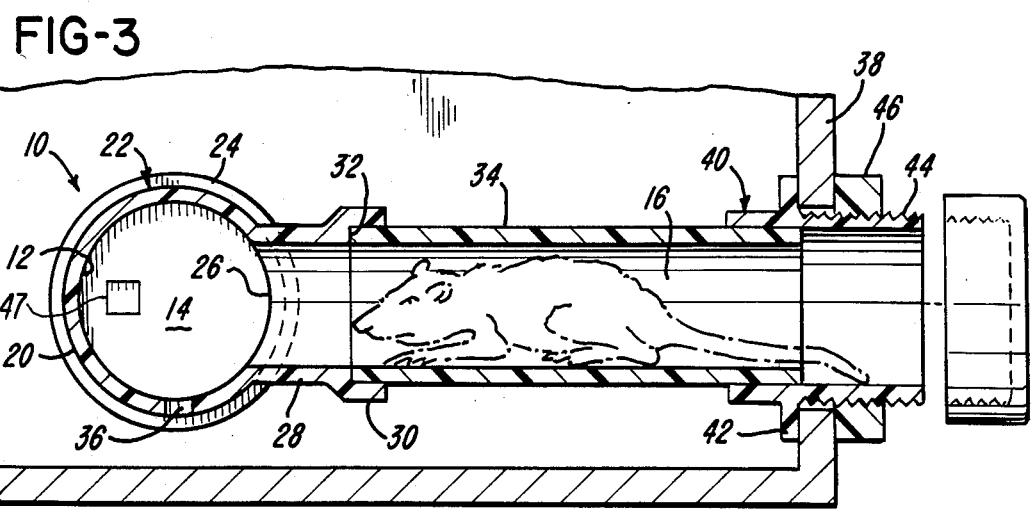

BAIT STATION

BACKGROUND OF THE INVENTION

The present invention provides means for simply, safely and effectively dealing with and eliminating rodents and, more particularly, a highly improved tamper-proof bait station readily adapted for use in and in a releasably secured relation to any waste receiver or building structure the premises of which, for one reason or another, may attract rats or like rodents. It will be described herein with reference to a preferred embodiment applied to and in connection with a dumpster. It is to be understood, however, that this is only by way of illustration and not by way of limitation, either as to the form of its embodiment or the method or nature of its application.

As known in the prior art, those devices holding a bait material as a lure to rats and like rodents, herein referred to and otherwise known as a "bait station", have often been found objectionable and unsatisfactory in their use. In most cases their nature is such that (a) they are easily disturbed and rendered useless; (b) they exhibit questionable efficiency in use; (c) they are usually difficult and distasteful to maintain; (d) by reason of their construction the bait therein will quickly deteriorate and/or (e) they present an attractive nuisance posing, in particular, a continuing threat to the health and welfare of children and those animals which are not the target rodents.

The foregoing and other problems which have been well evidenced in use of devices of the prior art. To all intents and purposes these problems are solved by the present invention.

Those substantively involved in the present disclosure are not aware of any prior art which is specifically pertinent to the features of novelty which are set forth and herein claimed.

SUMMARY OF THE INVENTION

The present invention has in view a new and improved bait station which may be readily and easily installed in connection with and made a releasable part of the wall structure of a dumpster, other waste or garbage container or any building to which a rodent might seek entry for the purpose of finding food.

One embodiment thereof comprises an elongate, hollow, tubular device having a single opening to and from its interior, which is otherwise sealed. The tubing of which it is formed is preferably fabricated of a tough, corrosion and distortion resistant, plastic such as a polyvinylchloride. It is weather resistant and constructed to be tamper-proof and to preserve and protect the bait therein from immediate deterioration. In its preferred construction this tubular device has a generally straight line configuration and one end portion thereof expanded and increased as to its cross sectional area to define therein a bait chamber. The remainder of the length of the device, the cross sectional area of which is substantially less than that of said chamber, defines a single passage in communication with said chamber, the only access to which is by way of the opening to said passage at the end thereof remote from said chamber. Said passage is limited as to its cross section to insure that no animal larger than the target rodent(s) may enter the same to feed.

In a preferred application and use thereof, an embodiment of the present invention is adapted to be easily mounted within and connected to a waste receptacle, container or other enclosure. For such an application the head of the bait station is provided, preferably, with one or more very small apertures. The connection of the bait station within the waste receptacle, container or other enclosure is achieved by lodging and releasably securing that portion thereof defining its access opening within a complementary aperture formed in the external wall portion of the structure to which it applies, adjacent the base thereof. The effect of this installation is to provide a convenient opening in the exterior wall of the structure in which the bait station is housed which is so visible as to entice entrance thereto of the target rodent(s). This enticement is enlarged by the use of the aforementioned very small apertures in the wall of the bait chamber to transmit odors from the interior of the waste receptacle, container or other enclosure which are most inviting to the rodents.

A most preferred embodiment of the invention is made of polyvinylchloride tubing, has a T shape and the bait chamber defined in the head thereof and arranged to hold a substantial quantity of bait in a releasably fixed connection with its inner wall. The amount of the bait can be made sufficient to feed a number of rodents and thereby to reduce the maintenance requirements for the invention device.

A primary object of the invention is to provide a new and improved bait station for rodents, such as rats, which is economical to fabricate, most efficient and satisfactory in use and easy to clean and maintain.

Another object is to provide a bait station for rodents which is tamper-proof.

A further object is to provide a bait station for rodents which will preclude ready access thereto by other than the target rodents or smaller rodents.

An additional object is to provide a new and improved bait station which is readily adapted for use within and in connection with the wall structure of a waste receptacle, container or other enclosure or structure the contents of which may attract rodents.

Another object is to provide a bait station for rodents formed of simple plastic tubing fabricated, preferably, of a polyvinylchloride.

A further object is to provide a more sanitary bait station for rodents which can be easily flushed and cleaned and easily and quickly removed and installed, as and where necessary.

An additional object is to provide a bait station for rodents possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not the only form of embodiment and use of the invention is illustrated, FIG. 1 is a perspective view of a preferred embodiment of the invention;

FIG. 2 illustrates an application of the embodiment of FIG. 1 in connection with a dumpster; and FIG. 3 is a longitudinal sectional view of the embodiment of FIG. 1 as shown in FIG. 2.

A bait station for rodents such as rats, for example, as seen in FIG. 1, comprises hollow apparatus 10 one segment 12 of which defines a feeding chamber 14 and the remainder a passage 16. The passage 16 serves as the only path through which the target rodents may pass to and exit from the chamber 14 and the apparatus 10 of which it forms a part.

In its preferred application, the bait station has that end of its passage 16 which is most remote from its chamber 14 positioned to open from the exterior surface of a wall structure bounding an area within which are located one or more substances which will attract the rodents. Such an application is shown in FIG. 2.

More particularly, one form of the invention embodiment is comprised of tubing, and appropriate tubular fittings as and where required. As illustrated, the apparatus 10 which defines the bait station is an elongate hollow tubular structure having a generally straight line configuration with a portion of its length, at one end 20 thereof, laterally expanded to produce therein the feeding chamber 14. In its preferred configuration the tubular structure 10 has a T shape the head of which, at its end 20, is provided by a short length of tubing 22 extending cross wise to the remainder thereof which forms its stem. The respective open ends of the tubing 22 are each closed by a cap or plug 24 at least one of which is releasably but securely attached, by suitable means. This last facilitates the application of bait within the chamber 14 and the cleaning of both the chamber 14 and passage 16 in a most expeditious manner, as and when necessary. Attention is directed to the fact that the chamber 14 is so configured and sized as to make it possible to adhesively attach a number of separate portions of the bait 47 utilized along its bounding wall surface, insuring a quantity thereof sufficient to feed a number of rodents. This in itself minimizes maintenance requirements in the use of the invention embodiments.

The tubing 22 is in this case provided with a single access opening 26 which is centered between its ends and rimmed at its outer surface by a relatively short stub-like, tubular projection 28 formed integral therewith and projected outwardly from and perpendicular thereto. The end portion 30 of the projection 28 most remote from the chamber 14, is uniformly expanded as to its interior cross section an amount corresponding in dimension to that of the wall thickness of the preceding portion thereof, producing therein a socket, the base of which is defined by a radial shoulder 32. The shoulder 32 thus formed in the inner wall surface of the projection 28 is bounded at its outer limit by that portion of such inner wall surface which extends from and perpendicular to the plane of the shoulder to the outer extremity of this projection.

A relatively elongated tube 34, the inner diameter of which corresponds to that of the opening 26 and the shoulder 32 and the radial wall thickness of which corresponds in dimension to the radial extent of the shoulder, has one end portion thereof telescopically applied within and in a press fit relation to the expanded end of the projection 28 and secured thereto by an adhesive, in end abutted relation to the shoulder 32. As to applied, the tube 34 projects outwardly from and coaxial with the projection 28.

The tube 34 substantially exceeds in length that portion of the apparatus 10 defined by the tubing 22 and its projection 28. As will be seen, the inner wall surface of the tube 34 forms a direct extension of that of the projection 28 preceding the shoulder 32 and defines therewith the passage 16 through which a rodent must pass to reach the feeding chamber 14 and the bait therein.

FIG. 3 illustrates the manner and nature of disposition of the bait station of the invention such as recommended when it is applied within a waste receptacle, enclosure or container (in this instance a dumpster) to have its entrance end project therefrom and open through and outwardly of a wall 38 thereof, adjacent its base. For such purpose the wall 38 will be provided with an appropriate aperture. In addition thereto, the outer projected extremity of the tube 34 will be press fit in one end portion of a short length of tubing providing an adapter 40. As here configured and applied, the adapter 40 not only defines an extension of the passage 16 but is externally formed, intermediate its ends, with a radial flange 42 and outwardly of the flange with an external thread 44. In the installation of the assembled bait station, the flange 42 abuts the inner surface of the dumpster wall 38 while the externally threaded portion 44 of the adapter outermost from the tube 34 and the flange 42 projects through a complementary aperture provided in the dumpster wall to present at the exterior surface thereof an inviting opening which will entice the target rodents to pass therethrough and eventually reach the chamber 14 and the bait therein. In the case illustrated, outwardly of the wall 38 a nut 46 is threadedly engaged to and about the threaded portion 44 of the adapter to draw the flange 42 into a tight abutment with the inner surface of the wall 38 and clamp to the outer surface of the wall. The bait station, thus fixed to and stably mounted within the interior of the dumpster, defines a blind alley for an invading rodent. The rodent will find food but only that which is conditioned to result in its early expiration.

In a most preferred embodiment of the invention the wall which bounds the chamber 14 will be provided with one or more very small apertures 36 through which will pass those odors which exude from waste and refuse within the dumpster wherein the bait station is mounted, thereby to add a further physical component to entice rodents which approach the dumpster to enter the passage 16.

The bait recommended for use within the bait station of the invention is a substance in which there has been deposited a quantity of an anti-coagulant sufficient to cause a rapid deterioration of the life support system of the rodent which feeds thereon an consequently its death soon thereafter. There is some delay in the lethal action of the anti-coagulant, by virtue of which death will not occur, usually, until the rodent returns to its burrow or nest. This makes the feeding area and that in the vicinity of the dumpster relatively free of decay and disease as a result of the elimination of the rodent. It also avoids an attractive nuisance dangerous to children and animals.

It is most preferred that tubing be employed in fabricating the invention embodiments and that this tubing is fabricated of a polyvinylchloride, which is tough, weather resistant, inherently sanitary in use and easy to flush and clean, as and when necessary.

To summarize, in a preferred embodiment thereof the present invention provides a bait station for rodents comprising an elongate, hollow tubular structure having a single opening to and from its interior. This station is formed of tubing fabricated, preferably, of tough, corrosion, weather and distortion resistant plastic such as a polyvinylchloride which is resistant to adherence of substance deposited thereon unless it is specifically affixed thereto. Its preferred configuration provides that one end portion of its tubular structure is enlarged as to its cross sectional area to define a bait chamber the entrance to and exit from which is limited to a single passage, defined by its remaining length the remote end of which provides the single opening to and exit from said passage. The cross sectional area of said passage is made substantially less than that of said chamber. This precludes entrance by animals larger than that of the target rodents and the enlargement of that portion of the station defining the chamber at the dead end thereof enables a relaxation of the rodent on reaching the same sufficient to induce it to eat the bait therein without feeling threatened. Preferred bait embodies a non-poisonous anti-coagulant, ingestion of which produces a breadkown of the rodent's life support system and its expiration, but not until some time after the rodent leaves the vicinity of the bait station. Most preferred embodiments of the invention have one or more very small apertures in the wall of their bait chamber to communicate odors from the environment in which they are placed and the end thereof remote from the chamber arranged for press fit in a tubular adapter which forms an extension thereof. This adapter may be inserted in a hole formed in the wall of a dumpster, other waste container or building, adjacent its base, and suitably secured thereto to dispose the interconnected bait station within the structure to which it applies with only its access opening revealed at the exterior of the wall.

Thus, the concept and arrangement of the invention embodiments make them simple and economical to fabricate and convenient to use and install, as and when required. Moreover, the ease and adaptability of their installation enables their presentation in a manner most likely to entice and lead rodents to their destruction, one after the other, without alarm. Furthermore, it should be clear that they are structurally stable and resistant to attack by the rodents. It is significant, in accordance with the invention, that rather than being obvious and used in a manner to keep rodents from an area of waste and debris, the invention embodiments are intended to lure rats and by reason of their attraction to the waste serve as a medium for their destruction in an inobvious manner which, moreover, does not lead to their dead bodies being deposited within or immediately of the waste so as to increase health hazards. A quite inobvious consequence is a reduction of insurance costs. Another significant aspect of the invention embodiments is that they are structures which in most cases are unitary and free of the requirement for moving parts in their function. Of course they do not serve as a trap and very easy to monitor. It is also noted that the small apertures or apertures utilized to provide for communications of odors with the interior of the invention units may be so positioned as to serve as drain areas for moisture and their access openings may be capped when out of service.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A bait station for rodents including one section defining an enclosed bait chamber and a relatively projected entrance-exit section defining a passage into and out of said chamber, said entrance-exit section having an inner end connected to said one section and opening into said chamber and an outer end which is normally open to define the access opening to said chamber which is limited as to its cross section to exclude the passage therethrough of any object perceptibly exceeding in size the target rodents, aid one section defining one end portion of said station, said access opening being at the opposite end of said station which is most remote from said chamber, said one section being defined by plastic tubing closed by cap means at least a portion of which is releasably secured thereto and said plastic tubing having a single access opening connected at the outer surface thereof to one end of a tube element which is anchored thereto and extends therefrom to define said entrance-exit section.

2. A bait station as in claim 1 wherein the end of said tube element remote from said plastic tubing is extended by an adapter to define an elongate passage leading to the access opening of said plastic tubing and said adapter provides means whereby said bait station may be projected through an aperture formed in a wall structure bounding an area within which is disposed waste or refuse to expose an access opening to said passage leading into said chamber in the outer surface of the wall structure.

3. A bait station for rodents including one section defining an enclosed bait chamber and a relatively projected entrance-exit section defining a passage into and out of said chamber, said entrance-exit section having an inner end connected to said one section and opening into said chamber and an outer end which is normally open to define the access opening to said chamber which is limited as to its cross section to exclude the passage therethrough of any object perceptibly exceeding in size the target rodents, said outer end of said entrance-exit section including external means for coupling thereof to a wall structure to align said access opening and place it in direct communication with an opening in and in a position to open from an exterior surface of said wall structure.

4. A bait station as in claim 3 wherein said external means includes means defining a stop for abutment with said wall structure and has means adjustably connected thereto to fix and stop against the wall structure to which it applies, thereby to stably mount said bait station in connection with the wall structure.

5. A bait station as in claim 3 wherein said sections are formed of plastic structurally resistant to load, deterioration and adherence thereto of debris.

6. A bait station for rodents including one section defining an enclosed bait chamber and a relatively projected entrance-exit section defining a passage into and out of said chamber, said entrance-exit section having an inner end connected to said one section and opening into said chamber and an outer end which is normally open to define the access opening to said chamber which is limited as to its cross section to exclude the passage therethrough of any object perceptibly exceeding in size the target rodents, and a waste container or receptacle, said entrance-exit section being coupled to a wall portion of said container or receptacle to have the end thereof remote from said chamber open from the exterior surface of said receptacle or container adjacent the base thereof.

7. Apparatus as in claim 6 wherein the end of said entrance-exit section remote from said chamber is extended by an adapter formed for coupling said bait station in a fixed relation to said wall portion of said container or receptacle and the wall surface bounding said chamber is provided with one or more very small apertures for communicating the interior of said chamber with its surrounding environment within said receptacle or container.

8. Apparatus as in claim 6 wherein said sections are formed of polyvinylchloride tubing and fittings where required.

9. A bait station for rodents comprising a first tubular element defining a bait chamber, said first tubular element being short in length, capped at each of its opposite ends and having an opening thereto between said ends, said opening being rimmed by an adapter to which one end of a second substantially longer tubular element is telescopically secured to define an entrance-exit passage in connection with said chamber having an entrance end which is normally open to provide the opening to said chamber for rodents, said rodent opening being limited as to its cross section to exclude the passage therethrough of any object perceptibly exceeding in size the target rodent and at least a portion of said capped ends of said first tubular element being releasably secured for access to said bait chamber for the cleaning thereof or introduction therein of bait, as needs require.

10. A bait station according to claim 9 wherein said capped tubular element includes one or more very small apertures which serve to direct odors from the surrounding environment to the interior of said first and second tubular elements.

11. A bait station according to claim 9 wherein said tubular structure is fabricated of elements formed of plastic, preferably a polyvinylchloride.

12. A bait station according to claim 9 wherein said bait station has a substantially T shaped configuration, said first tubular element defining the head of the T and said second tubular element forming the stem of the T.

13. A bait station as in claim 9 wherein separate portions of bait are detachably secured to inner surface portions of said capped tubular element.

14. Apparatus as in claim 9 including a waste container or receptacle and said second tubular element being coupled to a wall portion of said container or receptacle to have the entrance end thereof open from the exterior surface of said receptacle or container adjacent the base thereof.

15. Apparatus according to claim 14 wherein the end of said second tubular element remote from said chamber is extended by an adapter formed for coupling said bait station in a fixed relation to said wall portion of said container or receptacle.

* * * * *

UNITED STATES PATENT AND TRADEMARK OFFICE
CERTIFICATE OF CORRECTION

PATENT NO. : 4,630,392

DATED : December 23, 1986

INVENTOR(S) : Michael J. Ferraro

It is certified that error appears in the above-identified patent and that said Letters Patent is hereby corrected as shown below:

Col. 6, line 20 thereof (Claim 1, line 10) correct "aid" to read -- said --;

Col. 6, line 58 thereof (Claim 4, line 4) correct "and" to read -- said --.

Signed and Sealed this

Thirty-first Day of March, 1987

Attest:

DONALD J. QUIGG

*Attesting Officer*      *Commissioner of Patents and Trademarks*